United States Patent
Thakkar et al.

(10) Patent No.: US 6,203,605 B1
(45) Date of Patent: *Mar. 20, 2001

(54) PROCESS FOR IMPROVING DRIED FILM RESISTIVITY OF A CHEMICALLY MODIFIED CARBON BLACK DISPERSION

(75) Inventors: Sharad R. Thakkar, Beavercreek; Jing-Den Chen, Dayton, both of OH (US)

(73) Assignee: Scitex Digital Printing, Inc., Dayton, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/045,460

(22) Filed: Mar. 20, 1998

(51) Int. Cl.[7] .................................................. C09D 11/02
(52) U.S. Cl. ...................... 106/31.6; 106/31.86; 106/31.9
(58) Field of Search ............................... 106/31.6, 31.86, 106/31.9

(56) References Cited

U.S. PATENT DOCUMENTS

| | | | | |
|---|---|---|---|---|
| 5,324,349 | * | 6/1994 | Sano et al. | 106/31.68 |
| 5,571,311 | * | 11/1996 | Belmont et al. | 106/31.6 |
| 5,609,671 | * | 3/1997 | Nagasawa | 106/31.9 |
| 5,676,744 | * | 10/1997 | Thakkar et al. | 106/31.6 |
| 5,719,204 | * | 2/1998 | Beach et al. | 106/31.6 |

* cited by examiner

Primary Examiner—Helene Klemanski
(74) Attorney, Agent, or Firm—Barbara Joan Haushalter

(57) ABSTRACT

An ink jet ink composition comprises a liquid vehicle and a chemically modified pigment dispersion incorporating a chemical with a plurality of electron donating groups. The chemical is a monomer or a polymer. Dried ink film resistivity of aqueous carbon black pigment ink formulated in accordance with this composition is improved by being increased to a level whereby no electrical shorts which cause printer failure or print defects are observed during printing.

8 Claims, 2 Drawing Sheets

PROCESS FOR IMPROVING DRIED FILM RESISTIVITY OF A CHEMICALLY MODIFIED CARBON BLACK DISPERSION

TECHNICAL FIELD

The present invention relates to pigment inks and, more particularly, to a process for improving dried ink film electrical resistivity of an ink based on chemically modified carbon black dispersion.

BACKGROUND ART

Continuous ink jet recording has several advantages in that it produces low noise and can obtain a high-resolution recorded image at a high speed by utilizing a highly integrated head. Such an ink jet recording method uses as ink a solution obtained by dissolving one of various water-soluble dyes in water or a solvent mixture of water and an organic solvent. Current state-of-the-art aqueous ink jet inks utilize water soluble dyes to attain acceptable redissolvability of the dried ink on the orifice plate. This redissolvability is essential for good machine runnability as well as start-up for continuous ink jet printers which do not have a separate printhead cleaning fluid mechanism.

Because the water-soluble dye exhibits poor light resistance, when such a water-soluble dye is used, the light resistance of the recorded image frequently becomes a problem. In addition, because the ink is soluble in water, the water resistance of the recorded image also frequently becomes a problem. Namely, when rain, sweat or drinking water is applied to the recorded image, the recorded image is blurred with the ink or even disappears in some cases.

A water based pigment ink on the other hand, may be able to provide water fastness as pigments are dispersed rather than dissolved. Because writing utensils such as ball point pens, which use dyes, encounter the same problem, various kinds of aqueous pigment ink for writing utensils have been proposed for resolving the problems with respect to light resistance and water resistance. When conventional aqueous pigment ink for writing utensils is used in an ink jet printing device of the type in which printing is accomplished by discharging an ink from one or more orifices of a printhead as a stream of ink droplets, however, there is a problem in that the stability of drop stream generation is significantly deteriorated, and printing failure occurs. For pigment inks, then, redispersion, rather than redissolvability, must be achieved to have good system start-up. Use of pigments rather than dyes creates some further complications which are not present with dyes. For example, dye based inks provide films which have high dried film resistivity. Pigment based inks, particularly black inks, on the other hand, provide films which are electrically conductive.

When an ink which uses carbon black is used in ink jet printing, although the fastness of the image printed on plain paper is significantly improved, as compared with that of the image printed by using dye ink, later research reveals a disadvantage in that the density of the printed image is inferior to that of the image printed by using dye ink. Unfortunately, if the pigment concentration is increased to improve the print darkness, the discharging stability significantly deteriorated.

Because printing ink can be used at an extremely high concentration, compared to ink used in an ink jet printing device, the print density can be easily increased by increasing the pigment concentration in the ink. The density can also be increased by increasing the thickness of the coated ink layer. However, printing very dark images with ink jet printing is very difficult, because the size of the orifice is very small in high resolution ink jet printers such as Scitex continuous ink jet printers manufactured by Scitex Digital Printing, Inc., of Dayton, Ohio, and the amount of the ink printed is limited. In addition, as described above, an increase in the concentration of the pigment contained in the ink causes the occurrence of undesirable troubles in the formation of stable, straight jets. Although some of the conventional aqueous pigment inks have excellent jet forming properties for a relatively short time, such inks have a problem because the dried films of inks are quite conductive. This means that when a continuous ink jet printhead is shut down, the films formed from the dried inks tend to short out electrodes in the system, when an attempt is made to restart the printhead. On the other hand, it has been observed that inks whose dried film resistivity is too high give rise to another problem. When a jet is in "catch," that is, the drops are being recirculated rather than used for printing, there is typically an impact line on the catcher surface where the jet impacts. Just above the impact line, dried ink tends to collect, and if the ink is a pigment ink, the dried ink contains concentrated pigment. If the dried pigment is too insulating, the charge on the catch drops tends to accumulate on the area of dried pigment to the extent that it can deflect the ink stream away from the catcher. In this case, the stream of catch drops can actually reach the print media, causing an improper black streak.

Most of the traditional dispersions are made via physical grinding method using a dispersant with a pigment. Such pigment dispersions have been used for the last several years in coatings and printing industry as well as more recently in ink jet inks. More recently, a new chemically modified black dispersions have been prepared. U.S. Pat. No. 5,609,671 describes a dispersion prepared in such a manner. Due to this chemical modification, the pigment becomes less conductive compared to the unmodified particle. Even so, the conductivity is still high enough to cause charge lead to charge lead shorts in continuous ink jet printers.

It is seen then that there is a need for an improved pigment based ink suitable for use in continuous ink jet printers, which overcomes the problems associated with prior art inks. It would be particularly desirable to have such an improved pigment based ink, particularly inks based on chemically modified carbon black dispersion, suitable for achieving a dried ink film resistivity sufficient to eliminate charge lead to charge lead shorts.

SUMMARY OF THE INVENTION

This need is met by the process according to the present invention, which is a process for improving dried ink film resistivity of continuous ink jet inks, particularly inks based on chemically modified carbon black dispersion, rather than conventional aqueous dye-based inks.

In accordance with one aspect of the present invention, an ink jet ink composition comprises a liquid vehicle and a chemically modified pigment dispersion incorporating a chemical with a plurality of electron donating groups. The chemical is a monomer or a polymer. Dried ink film resistivity of aqueous carbon black pigment ink formulated in accordance with this composition is improved by being increased to a level whereby no electrical shorts which cause printer failure or print defects are observed during printing.

Other objects and advantages of the invention will be apparent from the following description and the appended claims.

DETAILED DESCRIPTION OF THE INVENTION

The present invention provides for a waterfast ink composition wherein the ink is a carbon pigment dispersion, rather than a conventional dye-based, aqueous ink jet ink, which provides improved dried film resistivity of carbon pigment ink jet inks.

Conventional aqueous dye based inks are made using dyes which have at least limited solubility in an aqueous medium. Hence, in an ink, there exists a "true"-0 solution of dye in the medium. When this particular ink is dried, the film formed has very high dried film resistivity.

With pigmented inks, when a film is formed, the dried film shows fairly low resistivity, as illustrated in Example 1, below. This is presumably due to the interparticle connection at the bare carbon particle surface. This then provides at least one path wherein particles are connected at the "bare" surface (without any adsorbate) of carbon particles. This causes low dried film resistivity with the negative result of charge lead to charge lead shorts.

The present invention specifically relates to elimination of this limitation for pigmented inks, especially for inks with chemically modified pigment dispersions. As disclosed in U.S. Pat. No. 5,609,671, totally incorporated herein by reference, such pigment particles are less conductive than the conventional non-modified pigment particles. Still, the dried ink film resistivity of these chemically modified dispersion based inks is not sufficient to avoid lead to lead shorts. According to the method of the present invention, dried film resistivity of these pigmented inks can be increased sufficiently to avoid any charge lead to charge lead shorts.

Figure 1A:
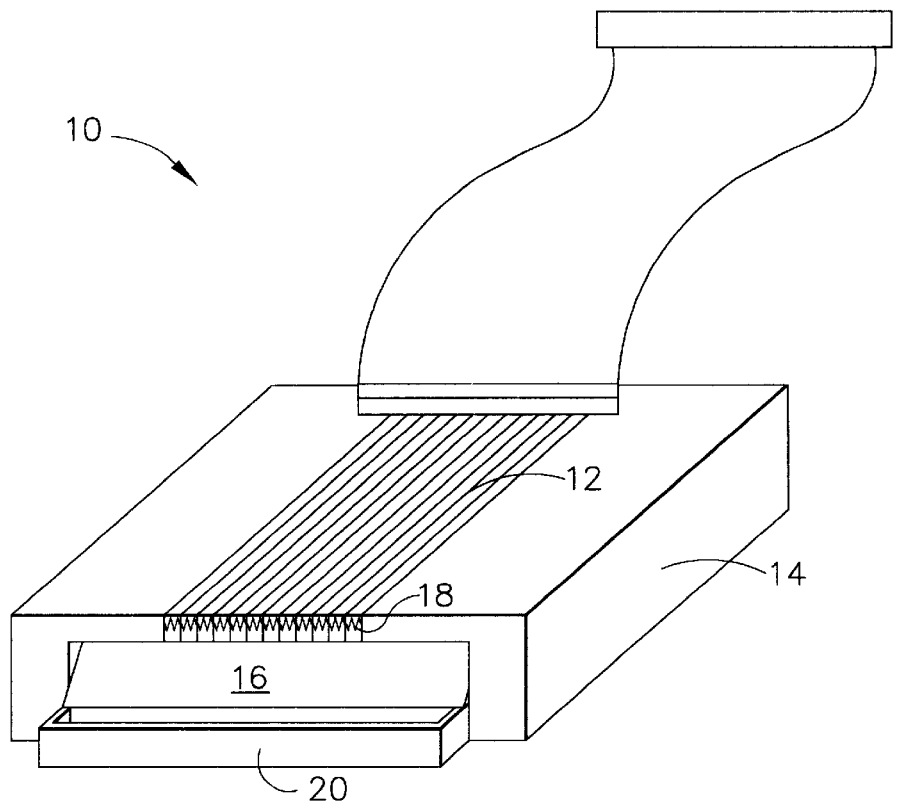
FIGS. 1A and 1B illustrate a typical ink jet print head catcher assembly.
Figure 1B:
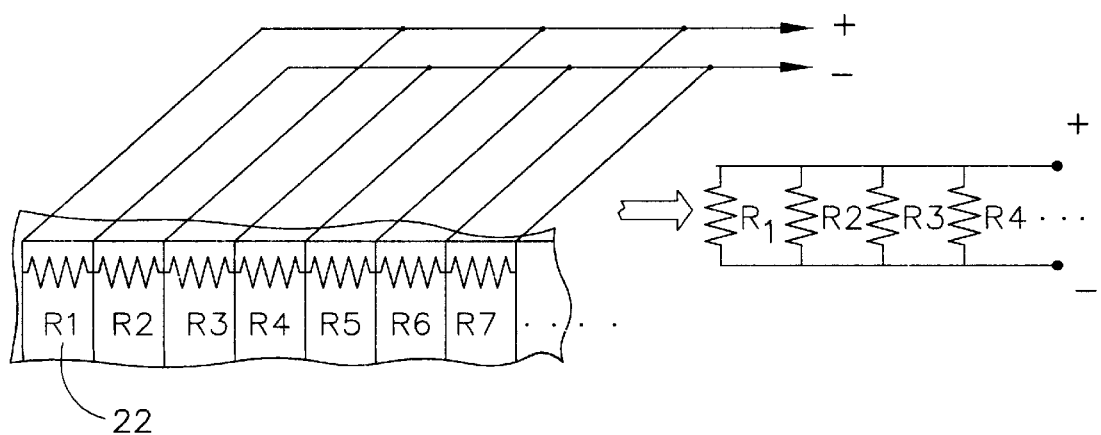

Referring now to the drawings, FIG. 1A illustrates a typical ink jet printhead catcher assembly 10. There are typically approximately 128 individual charging electrodes 12 bonded to a molded plastic catcher 14 in close proximity to the electrodes. During a typical ink jet start up, it is desirable to flush the charge electrodes with ink to remove any debris or ink residues. It is also necessary that the electrodes be isolated from each other after the start up procedure is finished, so that it is possible to control each electrode with either a high voltage (to charge or "catch" an ink droplet, at catch surface 16) or ground (not charging an ink droplet, i.e., printing the ink droplet), without affecting another electrode (and corresponding droplet). A catcher heater 18 is utilized to achieve both of these objectives by drying ink and/or condensation from the electrodes and then maintaining the electrode temperature above the dew point. A vacuum chamber 20 removes ink or fluid off the leads during start up. The drying and maintaining process of the catcher heater 18 inherently leaves a thin film of ink 22, as shown in FIG. 1B, which dries upon application of heat through a catcher heater. This demands a requirement of an ink formulation to have a high dried ink film resistivity, indicated as resistors R1–R7 in FIG. 1B, in order to maintain enough insulation between electrodes.

Figure 2:
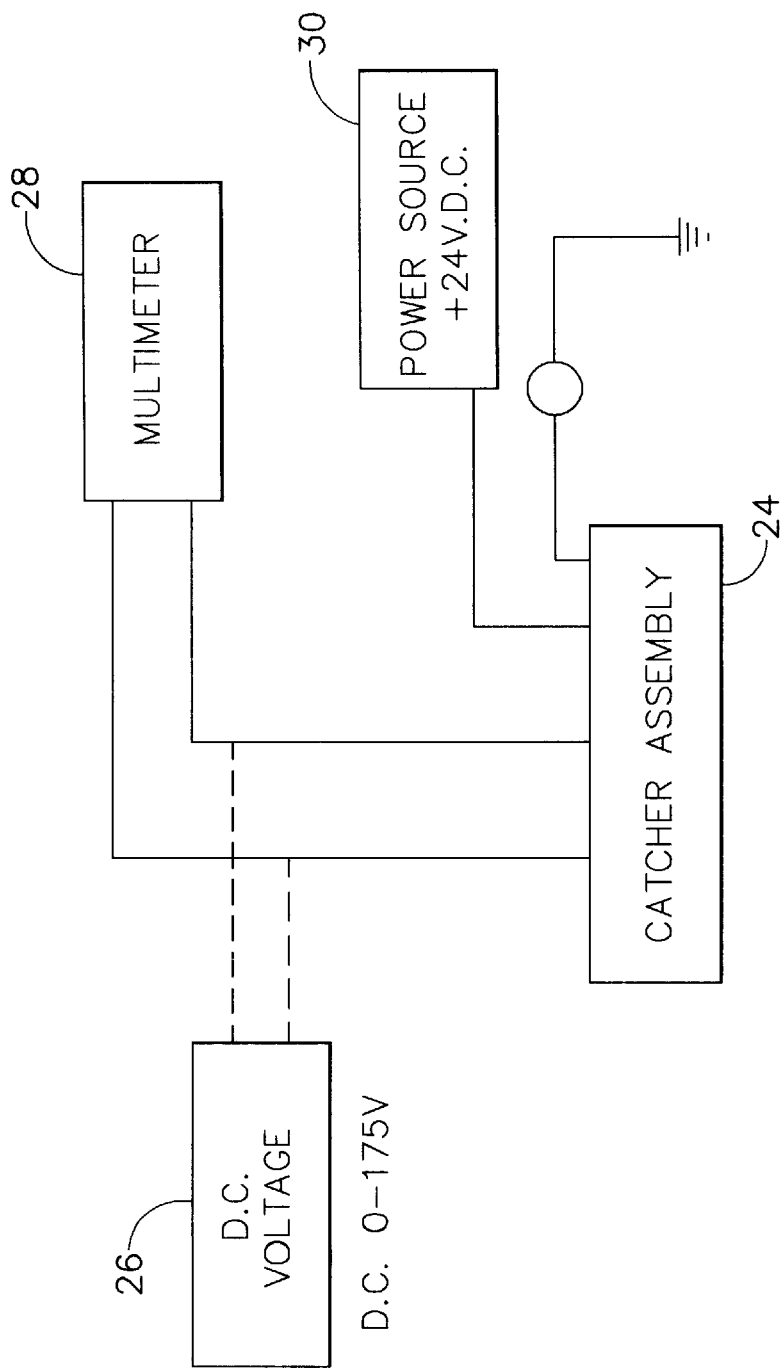
FIG. 2 illustrates a schematic block diagram of a catcher assembly.

In order to evaluate this characteristic of ink formulations, a test apparatus was developed which is shown schematically in FIG. 2. This closely duplicates the effect of running the ink in the typical planar charge ink jet print head. Additionally, the apparatus is able to produce measurable results for comparison rather than just pass/fail. As shown in FIG. 2, the apparatus comprises a typical ink jet print head catcher assembly 24 connected such that every alternate electrode is shorted together; producing just two common connection points to all electrodes. This allows measurement of resistance between the electrodes or application of a voltage differential between electrodes. A D.C. 0–175V block 26 connects between every other lead in FIG. 1B to provide voltage. Additionally, multimeter 28 reads voltage or resistance measurements. Finally, a +24 V D.C. power source 30 drives the catcher heater 18 as illustrated in FIG. 1A, to simulate the ink jet printhead during start up.

Experiments conducted in accordance with the present invention determined a resistance threshold between electrodes which would cause sufficient conductivity to cause a "catch" electrode to be pulled down to a "print" electrode when its neighbor was a print electrode. This effect is the most obvious indication of a high dried ink film conductivity.

This was theoretically determined to be approximately 80K ohms, or twice the value of the pull-up resistor for each electrode (which is 41K ohms). This would cause a "catch" droplet charge to be reduced by one third; usually enough to cause the "catch" droplet to become a "print" droplet.

Experiments were conducted and essentially verified that when any electrode to electrode resistance dropped to about 80K ohms (or less) print patterns using either one of those electrodes appeared as both electrodes printing.

More importantly, the ink film resistance threshold between electrodes sufficient to cause current/power passed between the electrodes to break down the ink film and to cause arcing between two electrodes when one is at high voltage ("catch") and the next at ground ("print"), was also determined. This effect will not appear until a sufficient printing speed is reached. Since print speed is user dependent, a good formulation should allow adequate margin to allow the user to obtain high print speeds without damage to the print head.

Obviously this threshold is difficult to predict since the area of interest involves the reaction of just two 0.004" wide electrodes separated by 0.00433", covered with an extremely thin layer (probably <0.0005") of conductive dried ink film.

In accordance with the present invention, a substantial number of experiments were conducted using pigmented inks which left ink film resistances across the electrodes. By measuring individual resistances between consecutive electrodes and by applying a constant voltage differential between them, it can be determined that the maximum power tolerable between any two electrodes is about 25 mW, before the ink breaks down and arcing occurs, which in turn could destroy the epoxy used to bond the electrodes to the charge plate part of the "catcher".

Using this data, and the fact that the electrode charge voltage could be as high as 175 volts, the minimum resistance between any two adjacent electrodes can be calculated to 1.2M ohms. However, for most applications it is not realistic to expect the charge electrode voltage differential to exist 100% of the time but more realistic to expect a worst case of perhaps 37.5% of the time. Therefore, for an average power of 25 mW, a power of 66 mW could be tolerated at a 37.5% duty cycle. Using this new threshold, the minimum resistance between any two adjacent electrodes can be calculated to approximately 464K ohms. Of course, it will be obvious to those skilled in the art that various factors, such as moisture content and print speed, can affect the minimum resistance by several hundred, and even several thousand, K ohms. The present invention, therefore, proposes a process for improving dried ink film resistance to an amount sufficient to eliminate charge lead to charge lead shorts.

After obtaining the above information, it becomes possible to summarize the ability of the test apparatus to evaluate the conductivity of different ink formulations. The test apparatus could be used to directly measure the net resistance of a film of ink applied to the electrodes, although it should be realized that it is just that, i.e., a net of 128 parallel resistors. Meaning, the film will not be applied uniformly and will not react to heat/drying uniformly, such that the true result is actually a distribution of a relatively wide range of parallel resistances. The total resistance measurement theoretically could be a measurement of just two electrodes which just happen to be much lower than all the rest; or the total measurement could be a measurement of 128 equal parallel resistors (or total divided by 128 at any two electrodes). Using those extremes, it can be determined that when using the test apparatus to measure a film resistance, a measurement of 464K ohms would be very desirable; since the resistance between any two electrodes could be 464K to 59M (464K×128), which is acceptable through that entire range. Conversely, a measurement of 3.6K ohms would be very undesirable; since the resistance between any two electrodes could be 3.6K to 464K (3.6K×128) which is not acceptable through the entire range. It is preferred, then, that the measurement (as expected) realistically indicated a measurement of an area of about 10–15 electrodes of approximately equal resistances. This use of the test apparatus proves to be very effective for comparisons and for quickly identifying extremely formulations.

Another test using the same test apparatus was developed to directly measure the threshold where ink breakdown/arcing will occur. In this case a voltage differential is applied to the two common electrode points and gradually increased to the voltage where arcing is observed. Just as the resistance measurements would indicate, the arcing would usually first occur in just one area (at the 10–15 electrodes where the resistance is lowest). The ideal voltage differential tolerable would be the maximum voltage differential possible in a typical ink jet system or 175 volts. However, as discussed before, it would be acceptable to assume that this maximum voltage at worst case may be switching at a 37.5% duty cycle. Therefore, an acceptable constant voltage differential for this test apparatus would be 66 volts.

Utilizing the simple test apparatus and the two tests described above, it is possible to efficiently conduct accurate bench testing of ink formulations. A procedure is established in accordance with the present invention to use the test apparatus in a manner which mimics the typical ink jet print head start-up and produces measurable results by which to judge many ink formulations.

In accordance with the present invention, a procedure for determining dried ink film resistivity comprises the following steps. Initially, one ensures that electrode resistance measurement with the electrodes being clean and dry is greater than 4M ohms and that the catcher is cool, i.e., the heater is off. Second, a thin film of test ink is applied across all of the electrodes, using suitable means, such as a swab. Next, the catcher heater is energized for a sufficient amount of time, typically approximately 3 minutes, to evaporate all moisture from the ink. The fourth step requires turning the catcher heater off and monitoring the net resistance of the electrodes to obtain an equilibrium value. Finally, a low voltage differential is applied to the electrodes and gradually increased to the point where arcing is observed at some spot on the electrodes, before removing the voltage.

The invention is illustrated in more detail with the following examples. All the measurements quoted in examples were made using the test apparatus described above and illustrated in FIG. 2.

EXAMPLE 1

Example 1 shows dried ink film resistance of a conventional pigment dispersion in comparison to a chemically modified pigment dispersion:

| Pigment Dispersion | % by wt | Dried Film Resistance |
|---|---|---|
| Orient Black 144 (conventional) | 25 | 790 ohms |
| Bonjet CW-1 (chemically modified) | 25 | 4K ohms |

EXAMPLE 2

In this Example, chemically modified pigment dispersion (Bonjet CW-1) was evaluated with common additives for dried film resistance.

| Formulation: | % by wt |
|---|---|
| Bonjet CW-1 | 22 |
| surfactant | 0.3 |
| corrosion inhibitor | 0.1 |
| biocide | 0.1 |
| pH modifier | 1.0 |
| deionized water | balance |
| Total | 100 |

In Example 2, the dried ink film resistance is 6K ohms.

EXAMPLE 3

To the formulation shown in Example 2, various components were incorporated to improve dried ink film resistance. Specifically, the preferred components selected have at least three polar functional groups in close vicinity or a polymeric chain with polar functional groups. The dried film resistance results are given below:

| Component | % by wt | Dried Film Resistance |
|---|---|---|
| Glycerol | 1% | 35K ohms |
|  | 2% | 37K ohms |
|  | 3% | 80K ohms |
| Sorbitol | 1% | 0.18M ohms |
|  | 2.5% | 4.6M ohms |
|  | 3% | >20M ohms |
|  | 4% | >20M ohms |
|  | 5% | >20M ohms |
| acrylate polymer |  |  |
| Joncryl 60 | 10% | 380K ohms |
| Joncryl 134 | 20% | 500K ohms |
| Joncryl 52 | 5%0 | 6.2M ohms |
|  | 8.3% | 17M ohms |
| Joncryl 99 | 5% | 750K ohms |
|  | 14% | 17M ohms |
| Joncryl 61 | 14% | 30K ohms |
| Joncryl 73 | 15% | >20M ohms |
| Joncryl 57 + | (2.5%) |  |
| Joncryl 100 | (3%) | >20M ohms |

It is interpreted from the above results that dried ink film resistance is improved by addition of chemicals with at least three polar groups in close vicinity. Also, increasing the amount of the chemical with at least three polar groups in close vicinity results in higher dried ink film resistance, sufficient to eliminate charge lead to charge lead shorts.

Addition of various polymers also increases the dried ink film resistance. Again, increasing the amounts results in higher dried ink film resistance values, again sufficient to eliminate charge lead to charge lead shorts. In accordance with the present invention, combinations of polymers can also be used to achieve synergistic effect in increasing dried ink film resistance.

Industrial Applicability and Advantages

The present invention is useful in the field of ink jet printing, and has the advantage of improving dried film resistivity of chemically modified carbon black dispersions used in ink jet inks. The present invention has the further advantage of providing a process by which essential dried ink film resistivity is improved to avoid any charge lead to charge lead shorts.

The invention has been described in detail with particular reference to certain preferred embodiments thereof, but it will be understood that modifications and variations can be effected within the spirit and scope of the invention.

What is claimed is:

1. An ink jet ink composition for a continuous ink jet printer, the ink jet ink composition comprising a liquid vehicle, a carbon black pigment dispersion, and a chemical for chemically modifying the pigment dispersion, the liquid vehicle, carbon black pigment dispersion, and modifying chemical capable of producing an ink jet ink having an ink film that increases electrical resistivity to prevent electrical charge shorts in the continuous ink jet printer.

2. An ink jet ink composition as claimed in claim 1 wherein the chemical comprises a chemical having a plurality of electron donating groups.

3. An ink jet ink composition as claimed in claim 2 wherein the plurality of electron donating groups comprise three polar groups in close vicinity.

4. An ink jet ink composition as claimed in claim 1 wherein the chemical for chemically modifying the pigment dispersion is present in an amount from about 1% to 15% by weight.

5. An ink jet ink composition as claimed in claim 1 wherein the chemical comprises a glycerol.

6. An ink jet ink composition for use in a continuous ink jet printer, the ink jet ink composition comprising a liquid vehicle, a carbon black pigment dispersion, and at least one acrylate polymer, for formulating an ink jet ink composition having a high electrical resistivity.

7. An ink jet ink composition as claimed in claim 6 wherein the at least one acrylate polymer comprises an acrylate polymer having three polar functional groups.

8. An ink jet ink composition as claimed in claim 6 wherein the at least one acrylate polymer is present in an amount sufficient to achieve a dried ink film resistance value capable of eliminating charge lead to charge lead shorts in the continuous ink jet printer.

* * * * *